(No Model.)

W. JOBSON.
NUT LOCK.

No. 590,647. Patented Sept. 28, 1897.

WITNESSES:
G. B. Towles
Otis D. Swett

INVENTOR
Walter Jobson
BY Thomas P. Simpson
ATTORNEY.

UNITED STATES PATENT OFFICE.

WALTER JOBSON, OF LIVERPOOL, PENNSYLVANIA.

NUT-LOCK.

SPECIFICATION forming part of Letters Patent No. 590,647, dated September 28, 1897.

Application filed March 25, 1897. Serial No. 629,166. (No model.)

*To all whom it may concern:*

Be it known that I, WALTER JOBSON, a citizen of the United States, residing at Liverpool, in the county of Perry and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to produce a self-locking nut in three parts, which must be put on and taken off the bolt together, the ends being held to the locking-sleeve by reverse threads, while the bolt passes through but does not touch the sleeve.

Figure 1:
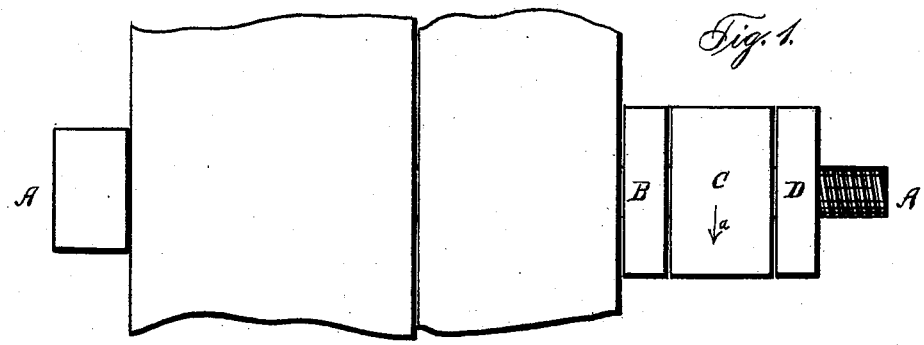
Figure 2:
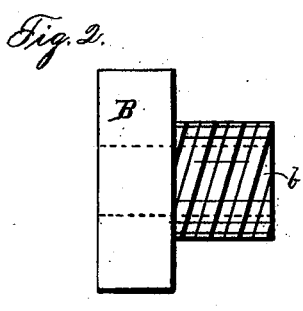
Figure 3:
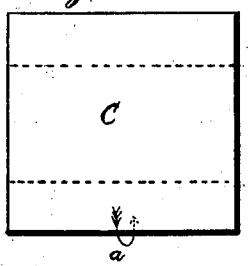
Figure 4:
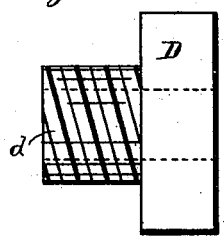
Figure 5:
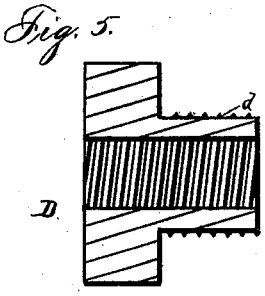
Figure 6:
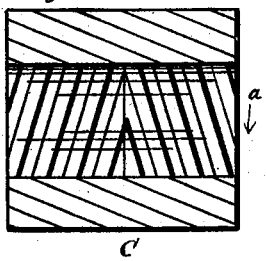
Figure 7:
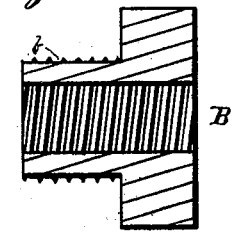

Figure 1 of the drawings is a side elevation; Fig. 2, a detail view of section B; Fig. 3, a detail view of section C; Fig. 4, a detail view of section D; Fig. 5, a detail view of section D on inside; Fig. 6, an inside view of section C; Fig. 7, a similar inside view of section B.

In the drawings, A represents an ordinary headed and end-threaded bolt which may be made with a neck of such shape that it cannot turn. My nut, which is intended to work on this bolt, consists of the three sections B C D, the two end ones working by right and left threads within the locking-sleeve C and the sections B D being provided with the externally-threaded projections $b$ $d$ and the interior bolt-threads of the same direction in both sections. The locking-sleeve C is made of larger diameter than the bolt, so that the latter may pass through without touching it. The sections B D are screwed not quite as far as they will go into the locking-sleeve C. Then the sleeve is turned in the direction of the arrow $a$ until it has drawn both the sections B D closely against it, the latter being connected with the sleeve C by reverse threads. They are both jammed against the threads of the bolt, so that the whole nut B C D cannot turn in any direction, the right and left threads being of a different pitch from those of the screws. In order to take the whole nut from the bolt, the lock-sleeve is turned in the opposite direction to that indicated by the arrow $a$, when it will unscrew like any other nut by means of a suitable wrench.

Having thus described all that is necessary to a full understanding of my invention, what I claim as new, and desire to protect by Letters Patent, is—

A nut-lock consisting of three sections B C D, the two end ones internally threaded and having externally-threaded projections $b$ $d$ screwing into right and left threads of the locking-sleeve C, whereby the latter may lock the sections B D on the bolt in the manner described.

In testimony whereof I affix my signature in presence of two witnesses.

WALTER JOBSON.

Witnesses:
J. L. JOBSON,
OTIS D. SWETT.